(12) United States Patent
Iwamura et al.

(10) Patent No.: US 8,072,939 B2
(45) Date of Patent: Dec. 6, 2011

(54) MOBILE COMMUNICATION METHOD, RADIO BASE STATION, AND MOBILE STATION

(75) Inventors: Mikio Iwamura, Yokohama (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/988,649

(22) PCT Filed: Aug. 14, 2009

(86) PCT No.: PCT/JP2009/064340
§ 371 (c)(1),
(2), (4) Date: Feb. 9, 2011

(87) PCT Pub. No.: WO2010/018865
PCT Pub. Date: Feb. 18, 2010

(65) Prior Publication Data
US 2011/0128937 A1   Jun. 2, 2011

(30) Foreign Application Priority Data
Aug. 15, 2008   (JP) .................................. 2008-209386

(51) Int. Cl.
*H04W 4/00* (2009.01)
(52) U.S. Cl. ........................................ 370/331; 455/436
(58) Field of Classification Search .................... None
See application file for complete search history.

(56) References Cited

U.S. PATENT DOCUMENTS

| | | | |
|---|---|---|---|
| 7,706,800 B2 * | 4/2010 | Sharaga | 455/439 |
| 2004/0131186 A1 | 7/2004 | Kasuya et al. | |
| 2007/0224993 A1 * | 9/2007 | Forsberg | 455/436 |
| 2008/0039095 A1 * | 2/2008 | Yoon et al. | 455/436 |
| 2009/0061878 A1 * | 3/2009 | Fischer | 455/436 |
| 2009/0209259 A1 * | 8/2009 | Brusilovsky et al. | 455/438 |

FOREIGN PATENT DOCUMENTS

| | | |
|---|---|---|
| JP | 2007-267120 A | 10/2007 |
| WO | 02/082715 A1 | 10/2002 |

OTHER PUBLICATIONS

International Search Report with translation from PCT/JP2009/064340 dated Sep. 8, 2009 (3 pages).
Written Opinion from PCT/JP2009/064340 dated Sep. 8, 2009 (3 pages).
3GPP TS 33.401 V8.0.0; "3rd Generation Partnership Project; Technical Specification Group Services and System Aspects; 3GPP System Architecture Evolution (SAE): Security Architecture"; Jun. 2008; pp. 26-30 (6 pages).
Extended European Search Report for Application No. 09806756.4 dated Jun. 8, 2011 (7 pages).
3GPP TS 33.401 V8.3.1 3rd Generation Partnership Project, "Technical Specification Group Services and System Aspects", XP-002634372, Mar. 2009 (62 pages).

* cited by examiner

*Primary Examiner* — Bob Phunkulh
(74) *Attorney, Agent, or Firm* — Osha • Liang LLP

(57) ABSTRACT

A mobile communication method according to the present invention includes steps of: generating, at a HO-source radio base station, an intermediate key ($K_{eNB}*$), by inputting, into a first function KDF (*), a base station key ($K_{eNB}$), identification information (PCI) of a HO-target cell, and identification information (ARFCN) of a frequency for the HO-target cell; and transmitting, from the HO-source radio base station to a HO-target radio base station, the intermediate key ($K_{eNB}*$), in the HO process; and generating, at the HO-target radio base station, a base station key ($K_{eNB}$) on the basis of the intermediate key ($K_{eNB}*$) in the HO process.

10 Claims, 6 Drawing Sheets

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

In the LTE (Long Term Evolution) system, security measures are taken for the "AS (Access Stratum)" which is for communication between a mobile station UE and a radio base station eNB.

Specifically, in the LTE system, the "C-plane Ciphering", "C-plane Integrity Protection", and "U-plane Ciphering" are employed as such security measures.

In this respect, a key $K_{RRC,ciph}$ is used when the C-plane Ciphering is performed, a key $K_{RRC,IP}$ is used when the C-plane Integrity Protection is performed, and a key $K_{UP,ciph}$ is used when the U-plane Ciphering is performed. All of these keys are generated from a base station key $K_{eNB}$.

FIG. 5(a) shows a typical layer structure of keys used in the LTE system. Here, a key $K_{ASME}$ is a key known only to an upper station MME and a mobile station UE, and is used for generating a base station key $K_{eNB}$.

Note that, a layer structure of keys used in the LTE system may have a form as shown in FIG. 5 (b), since generating a base station key $K_{eNB}$ requires a parameter called "NH (Next Hop)", which is generated from a key $K_{ASME}$.

Meanwhile, on a network side, a base station key $K_{eNB}$ is configured to be managed per mobile station UE by each radio base station eNB, and to be updated when the corresponding mobile station UE performs a handover.

The base station key $K_{eNB}$ is also managed by the mobile station UE so that the mobile station UE performs communication with the radio base station eNB. Using the same base station key $K_{eNB}$, the radio base station eNB and the mobile station UE can perform communication with security.

Next, a brief description is given of a procedure for updating a base station key $K_{eNB}$ with reference to FIG. 6.

In Step (1), when setting up connection for a mobile station UE, an upper station MME generates a temporary initial key ($K_{eNB}$) on the basis of a key $K_{ASME}$ and a "NAS SN (a sequence number in NAS=Non Access Stratum)".

In Step (2), the upper station MME notifies a radio base station eNB#1 of the temporary initial key ($K_{eNB}$) as an intermediate key $K_{eNB}^*$. In Step (3), the radio base station eNB#1 stores the received intermediate key $K_{eNB}^*$ without changing it as a base station key $K_{eNB}$.

In Step (11), the upper station MME also generates a parameter NH* on the basis of the key $K_{ASME}$ and the temporary initial key ($K_{eNB}$), and notifies the radio base station eNB#1 of the parameter NH*.

In Step (12), the radio base station eNB#1 stores the received parameter NH* without changing it as a parameter NH.

Consider a case where the mobile station UE thereafter performs a handover from a cell #1 under the control of the radio base station eNB#1 to a cell #2 under the control of a radio base station eNB#2. In this case, the radio base station eNB#1 generates an intermediate key $K_{eNB}^*$ in Step (4) by inputting the current base station key $K_{eNB}$ and the PCI (Physical Cell ID) of the cell #2 into a first function, more concretely, on the basis of the first function (key derivation function)=KDF ($K_{eNB}$, PCI), and notifies the radio base station eNB#2 of the intermediate key $K_{eNB}^*$.

Alternatively, the radio base station eNB#1 generates an intermediate key $K_{eNB}^*$ in Step (13) by inputting the current parameter NH and the PCI of the cell #2 into a first function, more concretely, on the basis of the first function (key derivation function)=KDF (NH, PCI), and notifies the radio base station eNB#2 of the intermediate key $K_{eNB}^*$, when the mobile station UE performs a handover from the cell #1 under the control of the radio base station eNB#1 to the cell #2 under the control of the radio base station eNB#2.

In such calculation processing for the intermediate key $K_{eNB}^*$, the key is updated on the basis of the PCI. The operation for updating the key on the basis of the PCI as described above is called a "PCI binding".

Here, the radio base station eNB#1 also notifies the radio base station eNB#2 of an "index increase identifier (Index increase indicator)" indicating which of KDF ($K_{eNB}$, PCI) and KDF (NH, PCI) is used as a basis for generating the intermediate key $K_{eNB}^*$.

The radio base station eNB#2 having received the intermediate key $K_{eNB}^*$ judges whether or not to perform a "C-RNTI binding" for the intermediate key $K_{eNB}^*$, on the basis of the "index increase identifier".

Specifically, if the radio base station eNB#2 recognizes from the "index increase identifier" that the intermediate key $K_{eNB}^*$ is generated on the basis of KDF ($K_{eNB}$, PCI), the radio base station eNB#2 generates a base station key $K_{eNB}$ in Step (5) by inputting the intermediate key $K_{eNB}^*$ and a mobile station identifier C-RNTI into a second function, more concretely, on the basis of KDF ($K_{eNB}^*$, C-RNTI). Here, the mobile station identifier C-RNTI is allocated temporarily to the mobile station UE in the cell #2.

On the other hand, if the radio base station eNB#2 recognizes from the "index increase identifier" that the intermediate key $K_{eNB}^*$ is generated on the basis of a current parameter NH, the radio base station eNB#2 sets the received intermediate key $K_{eNB}^*$ as a base station key $K_{enB}$ in Step (14).

Note that, the radio base station eNB#2 acquires a parameter NH newly from the upper station MME, when the upper station MME performs a "Path Switch", in preparation for a next handover for the mobile station UE.

Moreover, the radio base station eNB#1 notifies the mobile station UE of a parameter NCC (NH Chaining Count) through a handover command signal (Handover Command). Here, the parameter NCC indicates a number for the current parameter NH.

The mobile station UE updates a current base station key $K_{eNB[m]}$ with the following formulae to acquire a base station key $K_{eNB[m+1]}$ if the received parameter NCC is the same as the NCC held in itself.

$$K_{eNB}^* = KDF(K_{eNB[m]}, PCI)$$

$$K_{eNB[m+1]} = KDF(K_{eNB}^*, C\text{-}RNTI)$$

On the other hand, if the received parameter NCC is larger than the NCC held in the mobile station UE, the mobile station UE repeats calculation with the following formulae and updates the parameter NH until the NCC held in itself becomes equal to the received parameter NCC. The mobile station UE increments by one the NCC held in itself in every calculation with the following formulae:

$$NH^* = KDF(K_{ASME}, NH[m])$$

$$NH[m+1] = NH^*$$

With the aforementioned procedure, the base station key $K_{eNB}$ is updated in both of the mobile station UE and the radio base station eNB.

Meanwhile, when a handover fails for some reasons or when a problem with a radio link (Radio Link Failure) occurs during communication, the communication can be restored by the execution of reconnection control.

In order for the LTE system to succeed in the reconnection control, a radio base station eNB, to which the reconnection is to be performed, needs to hold beforehand the context of the mobile station UE (UE context). The LTE system thus can perform a "handover preparation process (HO Preparation)" on multiple neighbor cells.

The reason why the handover-source radio base station performs a "PCI binding" here is to ensure as much as possible the uniqueness of an intermediate key $K_{eNB}*$ in multiple cells in the execution of a "handover preparation process (HO Preparation)" on the cells and thereby to improve the security in the mobile communication system.

The use of the same intermediate key $K_{eNB}*$ for multiple cells in a handover preparation process accidentally allows radio base stations eNB having the intermediate key $K_{eNB}*$ to derive a base station key $K_{eNB}$ to be used by a handover-target radio base station eNB for communication with the mobile station UE. This makes the network vulnerable in terms of security.

SUMMARY OF THE INVENTION

Problem To Be Solved By The Invention

In a case of performing a "handover preparation process" on cells of the same frequency with the aforementioned method, the uniqueness of an intermediate key $K_{eNB}*$ can be ensured in the cells since a PCI is geographically unique.

To be more specific, consider a case shown in FIG. 7 where the same frequency is used in a handover-target cell under the control of a handover-target radio base station (Target eNB) and a preparation cell under the control of a radio base station targeted for a handover preparation process (Prepared eNB). In this case, the PCI of the handover-target cell under the control of the handover-target radio base station is different from the PCI of the preparation cell under the control of the radio base station targeted for a handover preparation process. For this reason, when a handover-source radio base station generates an intermediate key $K_{eNB}*_1$ by using the PCI of the handover-target cell under the control of the handover-target radio base station and generates an intermediate key $K_{eNB}*_2$ by using the PCI of the preparation cell under the control of the radio base station targeted for a handover preparation process, the intermediate key $K_{eNB}*_1$ turns out to be different from the intermediate key $K_{eNB}*_2$.

In a case of performing a "handover preparation process" on cells of different frequencies, however, a problem arises in that the uniqueness of an intermediate key $K_{eNB}*$ is less likely to be ensured, since cells having different frequencies and using the same PCI may exist neighboring to each other in some cases.

The present invention is therefore made in view of the aforementioned problem. An object of the present invention is to provide a mobile communication method, a radio base station, and a mobile station which allow ensuring the uniqueness of an intermediate key $K_{eNB}*$ in the execution of a "handover preparation process (HO Preparation)" on multiple cells, regardless of frequencies of the cells.

Means For Solving The Problem

A first aspect of the present invention is summarized as a mobile communication method of performing a handover process for allowing a mobile station to perform a handover from a handover-source cell under control of a handover-source radio base station to a handover-target cell under control of a handover-target radio base station, the method including the steps of : (A) generating, at the handover-source radio base station, an intermediate key, by inputting, into a first function, a base station key which is necessary for generating a key for communication of the mobile station in the handover-source cell, identification information of the handover-target cell, and identification information of a frequency for the handover-target cell; and transmitting, from the handover-source radio base station to the handover-target radio base station, the intermediate key, in the handover process; and (B) generating, at the handover-target radio base station, a base station key, on the basis of the intermediate key in the handover process, the base station key being necessary for generating a key for communication of the mobile station in the handover-target cell.

In the first aspect, in the step (B), the handover-target radio base station can generate the base station key necessary for generating the key for communication of the mobile station in the handover-target cell, by inputting, into a second function, a mobile station identifier temporarily allocated to the mobile station UE in the handover-target cell and the intermediate key.

A second aspect of the present invention is summarized as a mobile communication method of performing a handover process for allowing a mobile station to perform a handover from a handover-source cell under control of a handover-source radio base station to a handover-target cell under control of a handover-target radio base station, the method including the steps of : generating, at the handover-source radio base station, an intermediate key, by inputting, into a first function, a parameter notified by an upper station, identification information of the handover-target cell, and identification information of a frequency for the handover-target cell; and transmitting, from the handover-source radio base station to the handover-target radio base station, the intermediate key, in the handover process; and generating, at the handover-target radio base station, a base station key, on the basis of the intermediate key in the handover process, the base station key being necessary for generating a key for communication of the mobile station in the handover-target cell.

A third aspect of the present invention is summarized as a radio base station capable of serving as a handover-source radio base station in a mobile communication method in which a handover process is performed for allowing a mobile station to perform a handover from a handover-source cell under control of the handover-source radio base station to a handover-target cell under control of a handover-target radio base station, wherein the radio base station is configured to generate an intermediate key, by inputting, into a first function, a base station key which is necessary for generating a key for communication of the mobile station in the handover-source cell, identification information of the handover-target cell, and identification information of a frequency for the handover-target cell; and to transmit, to the handover-target radio base station, the intermediate key, in the handover process.

A fourth aspect of the present invention is summarized as a radio base station capable of serving as a handover-source radio base station in a mobile communication method in which a handover process is performed for allowing a mobile station to perform a handover from a handover-source cell under control of the handover-source radio base station to a handover-target cell under control of a handover-target radio base station, wherein the radio base station is configured to generate an intermediate key, by inputting, into a first function, a parameter notified by an upper station, identification information of the handover-target cell, and identification information of a frequency for the handover-target cell; and to transmit, to the handover-target radio base station, the intermediate key, in the handover process.

A fifth aspect of the present invention is summarized as a mobile station configured to perform a handover process for performing a handover from a handover-source cell under control of a handover-source radio base station to a handover-target cell under control of a handover-target radio base station, wherein the mobile station is configured to generate an intermediate key, by inputting, into a first function, a base station key which is necessary for generating a key for communication of the mobile station in the handover-source cell, identification information of the handover-target cell, and identification information of a frequency for the handover-target cell, in the handover-target cell; and the mobile station is configured to generate a base station key, on the basis of the intermediate key in the handover process, the base station key being necessary for generating a key for communication of the mobile station in the handover-target cell.

In the fifth aspect, the mobile station can generate the base station key necessary for generating the key for communication of the mobile station in the handover-target cell, by inputting, into a second function, a mobile station identifier temporarily allocated to the mobile station UE in the handover-target cell and the intermediate key.

A sixth aspect of the present invention is summarized as a mobile station configured to perform a handover process for performing a handover from a handover-source cell under control of a handover-source radio base station to a handover-target cell under control of a handover-target radio base station, wherein the mobile station is configured to generate an intermediate key, by inputting, into a first function, a parameter notified by an upper station, identification information of the handover-target cell, and identification information of a frequency for the handover-target cell, in the handover-target cell; and the mobile station is configured to generate a base station key, on the basis of the intermediate key in the handover process, the base station key being necessary for generating a key for communication of the mobile station in the handover-target cell.

In the sixth aspect, the mobile station can generate the base station key necessary for generating the key for communication of the mobile station in the handover-target cell, by inputting, into a second function, a mobile station identifier temporarily allocated to the mobile station UE in the handover-target cell and the intermediate key.

Effects Of The Invention

As described above, the present invention can provide a mobile communication method, a radio base station, and a mobile station which allow ensuring the uniqueness of an intermediate key $K_{eNB}^*$ in the execution of a "handover preparation process (HO Preparation)" on multiple cells, regardless of frequencies of the cells.

BEST MODE FOR CARRYING OUT THE INVENTION (Mobile Communication System According to First Embodiment of Present Invention)

A mobile communication system according to a first embodiment of the present invention is described with reference to FIGS. 1 to 4.

Figure 1:
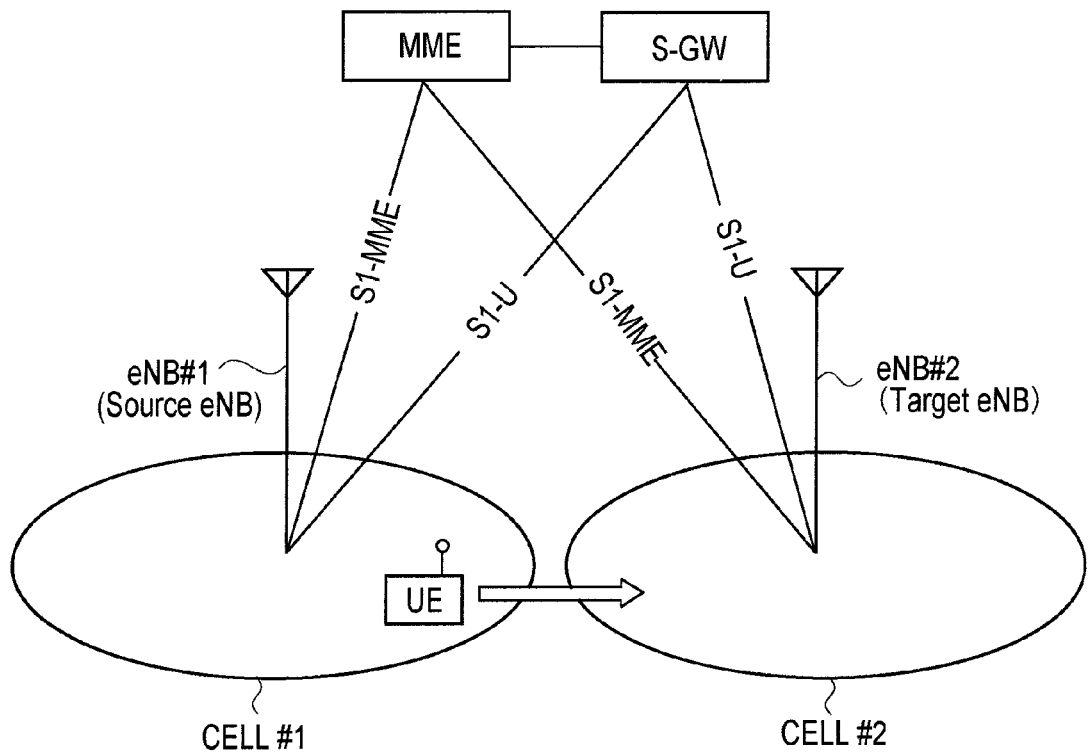
FIG. 1 is an overall configurational view of a mobile communication system according to a first embodiment of the present invention.

As shown in FIG. 1, the mobile communication system according to this embodiment is a mobile communication system of the LTE system, and includes a serving gateway apparatus S-GW (Serving Gateway), an upper station MME (Mobility Management Entity), and multiple radio base stations eNB#1 and #2.

The serving gateway apparatus S-GW is an entity performing routing in the U-plane (routing of user packets), and MME is a network entity in charge of control in the C-plane (such as authentication control, location registration control, and transmission/reception control).

Note that, as shown in FIG. 1, the mobile communication system according to this embodiment describes an example of a case where a handover process is performed for allowing a mobile station UE to perform a handover from a cell (handover-source cell) #1 under the control of the radio base station eNB#1 which is a handover-source radio base station (Source eNB) to a cell (handover-target cell) #2 under the control of the radio base station eNB#2 which is a handover-target radio base station.

Here, the handover-source cell #1 and the handover-target cell #2 may have the same frequency or different frequencies.

It should be noted that, when the handover-source cell #1 and the handover-target cell #2 have the same frequency, the handover-source cell #1 and the handover-target cell #2 are to have different PCIs; when the handover-source cell #1 and the handover-target cell #2 have different frequencies, the handover-source cell #1 and the handover-target cell #2 may have the same PCI or different PCIs.

This is due to the following reason. A PCI is an identifier on which scrambling of a radio channel and the like depend. Accordingly, if cells using the same frequency and the same PCI exist neighboring to each other, interference occurs and thus causes trouble in normal communication.

Thus, in order for the mobile communication system to function normally as a cellular system, a PCI needs to be geographically unique in cells of the same frequency. It is not problematic for cells using the same PCI to exist geographically neighboring to each other as long as the cells have different frequencies.

Figure 2:
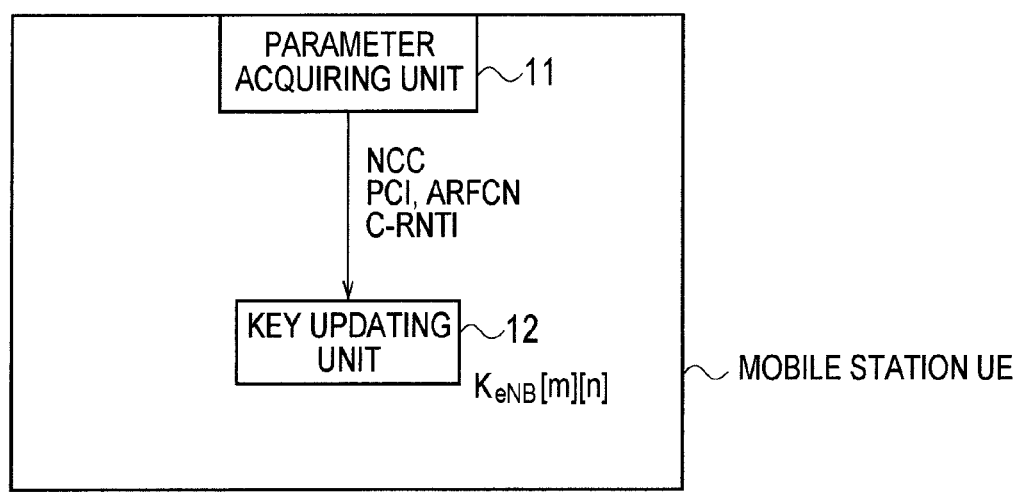
FIG. 2 is a functional block diagram of a mobile station according to the first embodiment of the present invention.

As shown in FIG. 2, a mobile station UE according to this embodiment includes a parameter acquiring unit 11 and a key updating unit 12.

The parameter acquiring unit 11 is configured to acquire parameters necessary for key update from the handover-source radio base station and the handover-target radio base station, in the handover process for the mobile station UE.

For example, the parameter acquiring unit 11 is configured to acquire, as the aforementioned parameters: an "NCC"; a "PCI" which is identification information of the handover-target cell; an "ARFCN" which is identification information of a frequency for the handover-target cell; a "C-RNTI" which is a mobile station identifier temporarily allocated to the mobile station UE in the handover-target cell; and the like.

Note that, in the LTE system, the ARFCN (Absolute Radio Frequency Code Number) is called an "EARFCN (E-UTRA ARFCN)".

The key updating unit 12 is configured to update a base station key $K_{eNB}$ which is necessary for generating keys necessary for generating a key for communication of the mobile station UE in the handover-source cell #1 (such as a key $K_{RRC, ciph}$, a key $K_{RRC, IP}$, and a key $K_{UP, ciph}$), to a base station key $K_{eNB}$ which is necessary for generating keys necessary for generating a key for communication of the mobile station UE in the handover-target cell #2, in the handover process for the mobile station UE.

Specifically, first of all, the key updating unit 12 is configured to generate an intermediate key $K_{eNB}*$ in a case where the received parameter NCC is the same as the NCC held in the mobile station UE, in the handover process for the mobile station UE. The key updating unit 12 is configured to generate the intermediate key $K_{eNB}*$, by inputting, into a first function KDF (*), a base station key $K_{eNB[m][n]}$ which is necessary for generating a key for communication of the mobile station UE in the handover-source cell #1, the PCI of the handover-target cell #2, and the ARFCN of a frequency for the handover-target cell #2.

Secondly, the key updating unit 12 is configured to generate a base station key $K_{eNB[m][n+1]}$ which is necessary for generating keys for communication of the mobile station UE in the handover-target cell #2, by inputting the mobile station identifier C-RNTI and the intermediate key $K_{eNB}*$ into a second function KDF (*), the mobile station identifier C-RNTI temporarily allocated to the mobile station UE in the handover-target cell #2.

For example, the key updating unit 12 is configured to update the base station key $K_{eNB}$ by the following formulae:

$$K_{eNB}* = KDF(K_{eNB[m][n]}, PCI, ARFCN)$$

$$K_{eNB[m][n+1]} = KDF(K_{eNB}*, C\text{-}RNTI).$$

On the other hand, if the received parameter NCC is larger than the NCC held in the mobile station UE, the mobile station UE is configured to repeat calculation with the following formulae, and to update a parameter NH, until the NCC held in itself becomes equal to the received parameter NCC. The mobile station UE is configured to increment by one the NCC held in itself in every calculation with the following formulae:

$$NH* = KDF(K_{ASME}, NH[m])$$

$$NH[m+1] = NH*.$$

The key updating unit 12 is configured to thereafter generate an intermediate key $K_{eNB}*$ by inputting, into the first function KDF (*), the parameter NH[m+1] notified by the upper station MME, the identification information PCI of the handover-target cell #2, and the identification information ARFCN of the frequency for the handover-target cell #2.

The key updating unit 12 is configured to then set the intermediate key $K_{eNB}*$ as a base station key $K_{eNB[m+1][0]}$ which is necessary for generating keys for communication of the mobile station UE in the handover-target cell #2.

Figure 3:
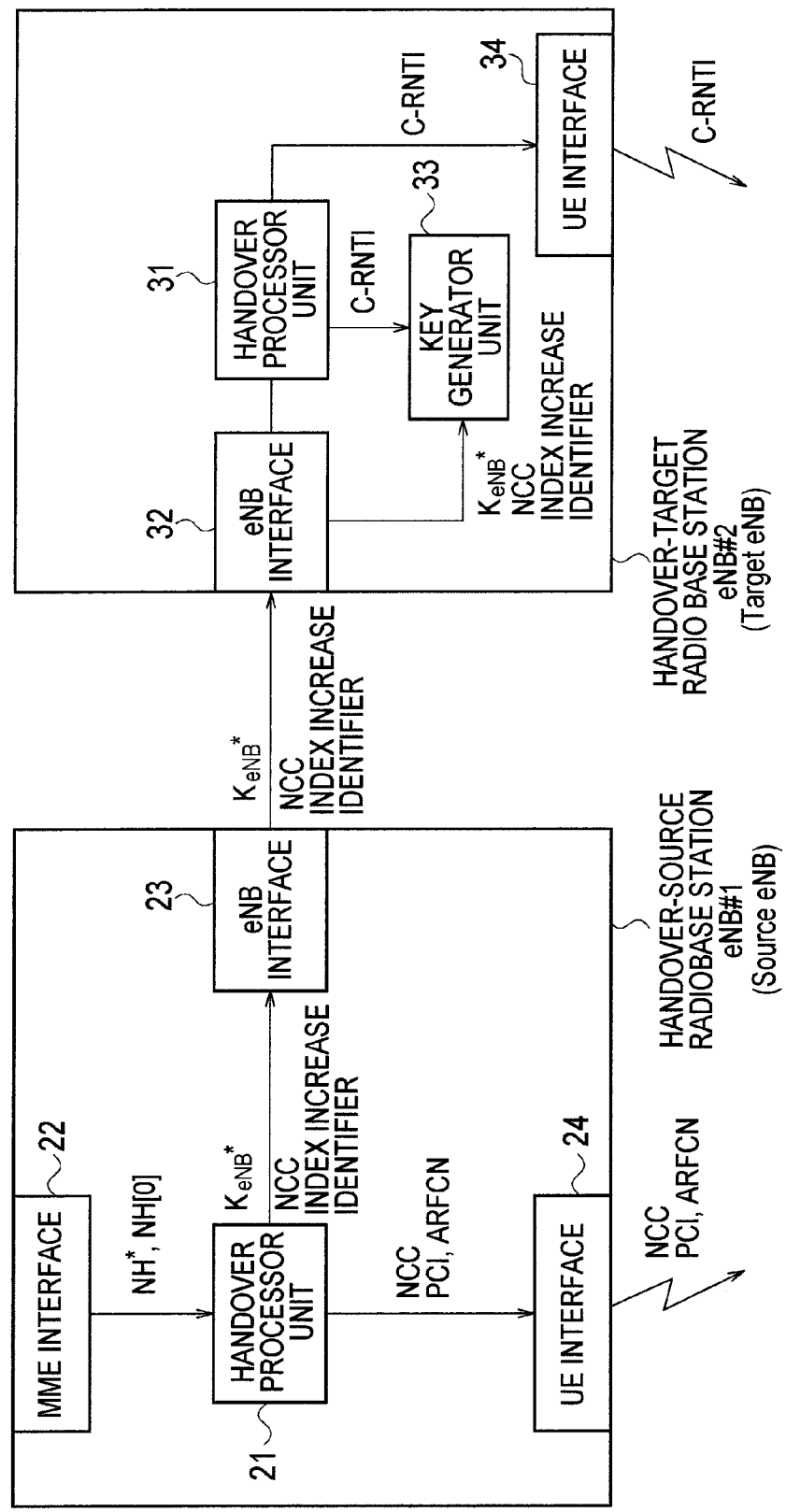
FIG. 3 is a functional block diagram of radio base stations (a handover-source radio base station and a handover-target radio base station) according to the first embodiment of the present invention.

As shown in FIG. 3, the radio base station eNB#1 serving as the handover-source radio base station (Source eNB) includes a handover processor unit 21, an MME interface (may also be called an S1 interface) 22, an eNB interface (may also be called an X2 interface) 23, and a UE interface 24.

The handover processor unit 21 is configured to acquire a parameter NH* from the upper station MME through the MME interface 22, in the handover process for the mobile station UE.

Moreover, the handover processor unit 21 is configured to acquire an initial parameter NH[0] from the upper station MME through the MME interface 22, in the connection setup for the mobile station UE.

Further, the handover processor unit 21 is configured to notify, to the radio base station eNB#2 serving as the handover-target radio base station (Target eNB), an intermediate key $K_{eNB}*$ a NCC, and an index increase identifier, through the eNB interface 23.

Furthermore, the handover processor unit 21 is configured to notify, to the mobile station UE, the NCC, and the PCI and ARFCN of the handover-target cell #2, through the UE interface 24.

Meanwhile, the radio base station eNB#2 serving as the handover-target radio base station (Target eNB) includes a handover processor unit 31, an eNB interface 32, a key generator unit 33, and a UE interface 34.

The key generator unit 33 is configured to generate a base station key $K_{eNB}$ which is necessary for generating of keys for communication of the mobile station UE in the handover-target cell #2, on the basis of the intermediate key $K_{eNB}*$, the NCC, the index increase identifier and a C-RNTI. The intermediate key $K_{eNB}*$, the NCC, and the index increase identifier are received through the eNB interface 32, and the C-RNTI is received from the handover processor unit 31 and allocated to the mobile station UE in the handover cell #2.

Figure 4:
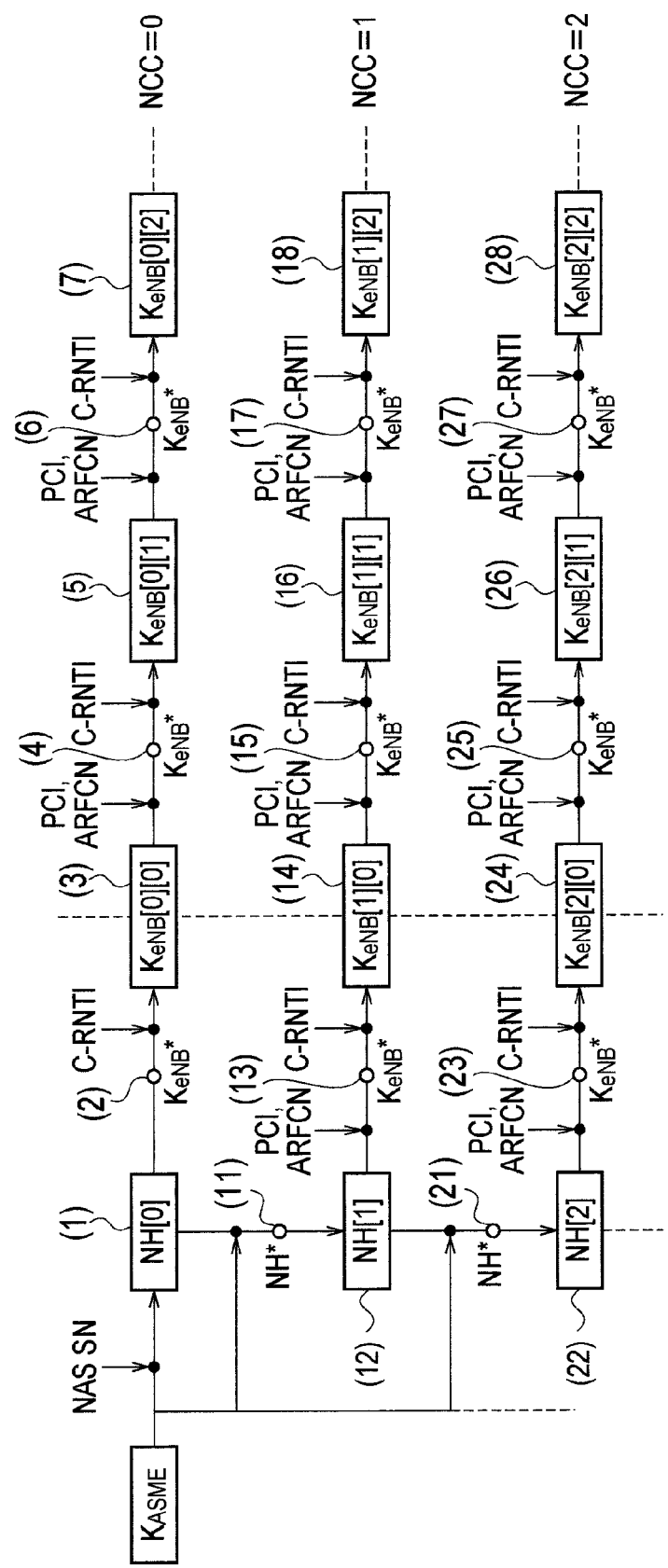
FIG. 4 is a diagram for explaining how a key $K_{eNB}$ is updated in the mobile communication system according to the first embodiment of the present invention.
Figure 5A:
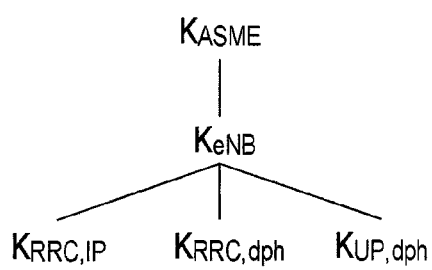
FIG. 5 is a diagram illustrating layer models for keys in a mobile communication system defined in the 3GPP.
Figure 5B:
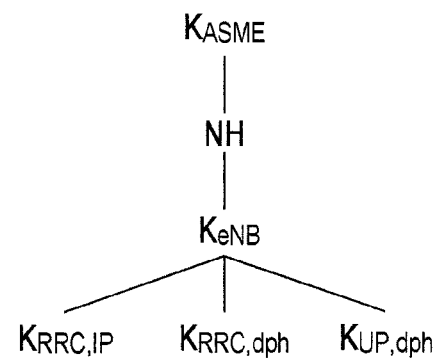
Figure 6:
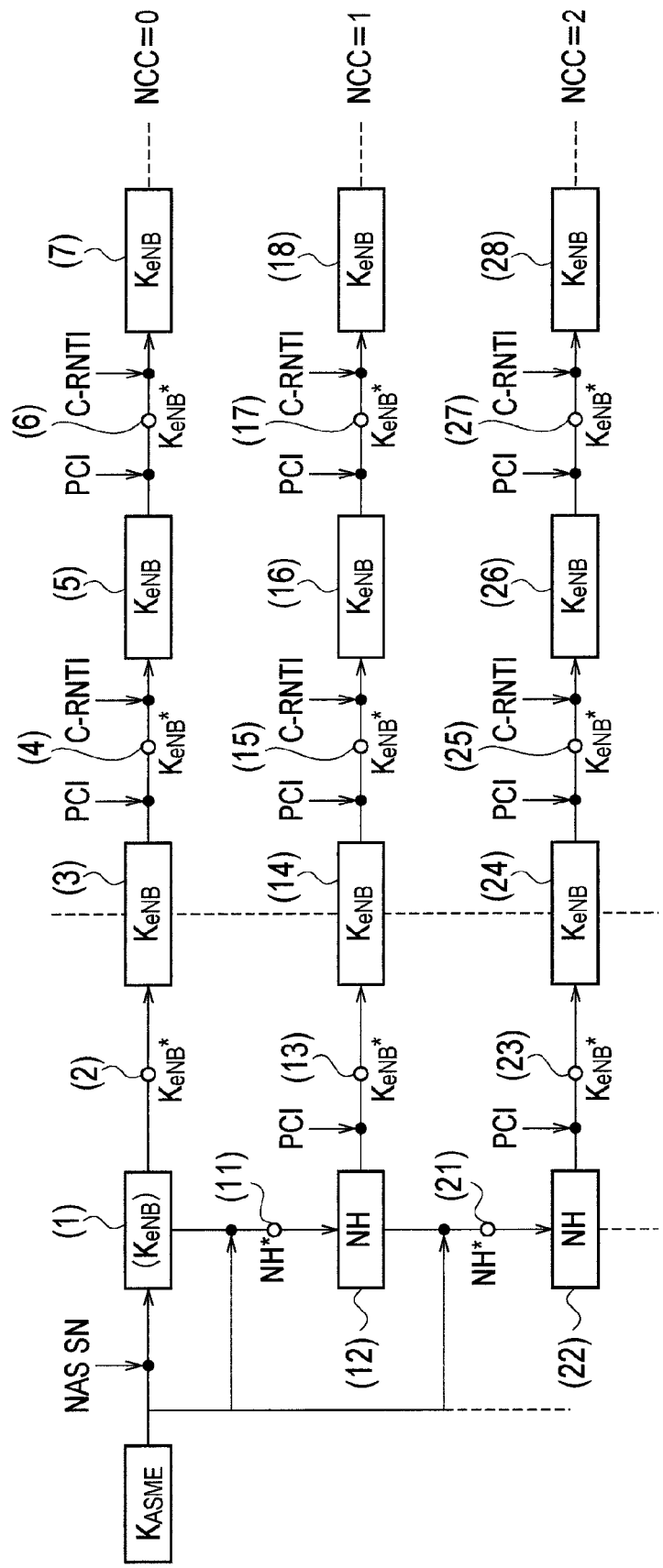
FIG. 6 is a diagram illustrating how a key $K_{eNB}$ is updated in the mobile communication system defined in the 3GPP.
Figure 7:
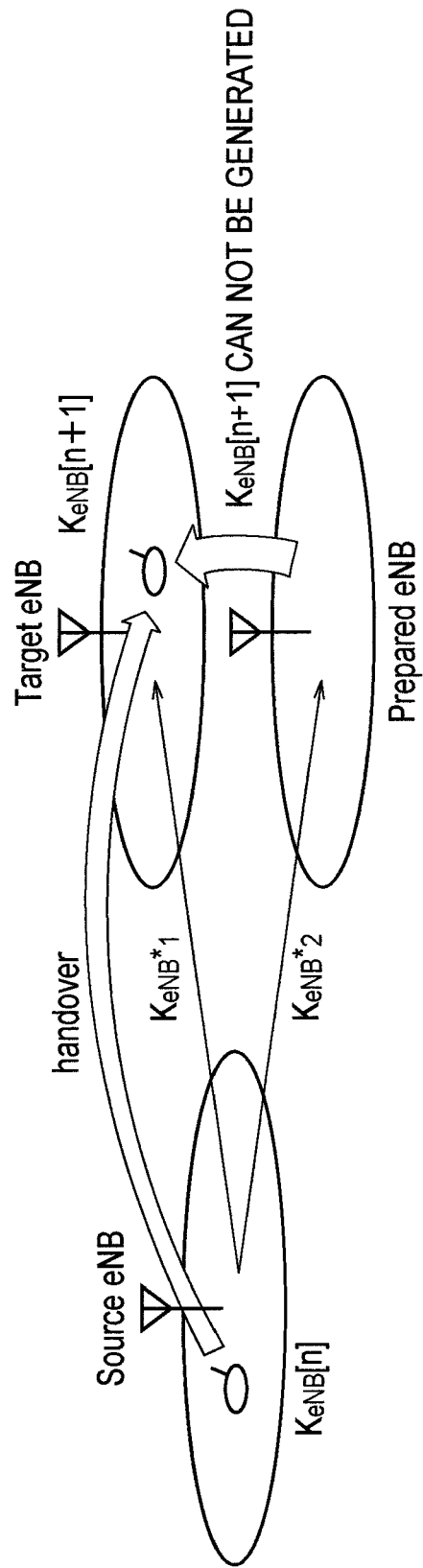
FIG. 7 is a diagram for explaining a problem in a conventional mobile communication system.

Hereinafter, with reference to FIG. 4, a description is given of how a base station key $K_{eNB}$ is updated when the mobile station UE performs a handover from the cell #1 under the control of the radio base station eNB#1 to the cell #2 under the control of the radio base station eNB#2.

In Step (1), when setting up connection for the mobile station UE, the upper station MME generates an initial parameter NH [0] on the basis of a key $K_{ASME}$ and a "NAS SN (a sequence number in NAS)".

In Step (2), the upper station MME notifies the radio base station eNB#1 of the initial parameter NH [0] as an intermediate key $K_{eNB}*$. In Step (3), the radio base station eNB#1 stores the received intermediate key $K_{eNB}*$ without changing it as a base station key $K_{eNB[0][0]}$.

In Step (11), the upper station MME also generates a parameter NH* on the basis of the key $K_{ASME}$ and the initial parameter NH [0], and notifies the radio base station eNB#1 of the parameter NH*.

In Step (12), the radio base station eNB#1 stores the received parameter NH* without changing it as a parameter NH [1].

Consider a case where the mobile station UE thereafter performs a handover from the cell #1 under the control of the radio base station eNB#1 to the cell #2 under the control of the radio base station eNB#2. In this case, the radio base station eNB#1 generates an intermediate key $K_{eNB}*$ in Step (4) by inputting the current base station key $K_{eNB[0][0]}$, the PCI of the cell #2, and the identification information ARFCN of a frequency for the cell #2 into a first function KDF (*), more concretely, on the basis of KDF ($K_{eNB[0] (0)}$, PCI, ARFCN), and notifies the radio base station eNB#2 of the intermediate key $K_{eNB}*$.

In other words, the operation for updating the key using the frequency identification information ARFCN, i.e., an "ARFCN binding" is performed.

In a case where the handover for the mobile station UE described above is a handover between cells under the control of the same radio base station eNB (Intra-eNB Handover), for example, the radio base station eNB#1 generates an intermediate key $K_{eNB}*$ on the basis of KDF ($K_{eNB[0] (0)}$, PCI, ARFCN), as described above. In this case, the radio base station eNB#1 and the handover-target radio base station eNB#2 are the same.

Alternatively, the radio base station eNB#1 may generate an intermediate key $K_{eNB}*$ in Step (13) by inputting the current parameter NH [1], the PCI of the cell #2, and the identification information ARFCN of the frequency for the cell #2 into the first function KDF (*), more concretely, on the basis of KDF (NH [1], PCI, ARFCN), and notify the radio base station eNB#2 of the intermediate key $K_{eNB}*$, when the mobile station UE performs a handover from the cell #1 under the control of the radio base station eNB#1 to the cell #2 under the control of the radio base station eNB#2 different from the radio base station eNB#1.

In a case where the handover for the mobile station UE described above is a handover between cells under the control of different radio base stations eNB (Inter-eNB Handover), for example, the radio base station eNB#1 generates an intermediate key $K_{eNB}*$ on the basis of KDF (NH [1], PCI, ARFCN), as described above.

Specifically, if the radio base station eNB#2 recognizes from the "index increase identifier", which is notified by the radio base station eNB#1, that the intermediate key $K_{eNB}*$ is generated on the basis of KDF ($K_{eNB [0] (0)}$, PCI, ARFCN), the radio base station eNB#2 generates a base station key $K_{eNB [0] (1)}$ in Step (5) by inputting the intermediate key $K_{eNB}*$ and the mobile station identifier C-RNTI, which is allocated temporarily to the mobile station UE in the cell #2, into a second function KDF (*), more concretely, on the basis of KDF ($K_{eNB}*$, C-RNTI).

On the other hand, if the radio base station eNB#2 recognizes from the "index increase identifier", which is notified by the radio base station eNB#1, that the intermediate key $K_{eNB}*$ is generated on the basis of the current parameter NH [1], the radio base station eNB#2 generates a base station key $K_{eNB [1] (0)}$ in Step (14) by inputting the intermediate key $K_{eNB}*$ and the mobile station identifier C-RNTI, which is allocated temporarily to the mobile station UE in the cell #2, into the second function KDF (*), more concretely, on the basis of KDF ($K_{eNB}*$, C-RNTI).

Note that, the first function and the second function may be the same function or different functions as long as they are known to both the radio base station eNB and the mobile station UE.

Further, the "PCI binding" and "ARFCN binding" in Step (4) and Step (13) may be performed by the radio base station eNB#2 which is the handover-target radio base station instead of being performed by the radio base station eNB#1 which is the handover-source radio base station.

Furthermore, the "C-RNTI binding" in Step (5) and Step (14) may be omitted.

(Advantageous Effect of Mobile Communication System According to First Embodiment of Present Invention)

The mobile communication system according to the first embodiment of the present invention is configured in that the handover-source radio base station generates an intermediate key $K_{eNB}*$ by using not only the PCI of the handover-target cell (or a cell targeted for a handover preparation process) but also the identification information ARFCN of a frequency for the handover-target cell (or the cell targeted for the handover preparation process). This allows the mobile communication system according to the first embodiment of the present invention to ensure the uniqueness of the intermediate key $K_{eNB}*$ in the execution of the "handover preparation process" on multiple cells.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

EXPLANATION OF REFERENCE NUMERALS

UE Mobile station
11 Parameter acquiring unit
12 Key updating unit
Source eNB Handover-source radio base station
21, 31 Handover processor unit
22 MME interface
23, 32 eNB interface
24, 34 UE interface
Target eNB Handover-target radio base station
33 Key generator unit

The invention claimed is:

1. A mobile communication method of performing a handover process for allowing a mobile station to perform a handover from a handover-source cell under control of a handover-source radio base station to a handover-target cell under control of a handover-target radio base station, the method comprising the steps of :
   (A) generating, at the handover-source radio base station, an intermediate key, by inputting, into a first function, a base station key which is necessary for generating a key for communication of the mobile station in the handover-source cell, identification information of the handover-target cell, and identification information of a frequency for the handover-target cell; and transmitting, from the handover-source radio base station to the handover-target radio base station, the intermediate key, in the handover process; and (B) generating, at the handover-target radio base station, a base station key, on the basis of the intermediate key in the handover process, the base station key being necessary for generating a key for communication of the mobile station in the handover-target cell.

2. The mobile communication method according to claim 1, wherein
in the step (B), the handover-target radio base station sets the intermediate key as the base station key in the handover process.

3. A mobile communication method of performing a handover process for allowing a mobile station to perform a handover from a handover-source cell under control of a handover-source radio base station to a handover-target cell under control of a handover-target radio base station, the method comprising the steps of:
(A) generating, at the handover-source radio base station, an intermediate key, by inputting, into a first function, a parameter notified by an upper station, identification information of the handover-target cell, and identification information of a frequency for the handover-target cell; and transmitting, from the handover-source radio base station to the handover-target radio base station, the intermediate key, in the handover process; and
(B) generating, at the handover-target radio base station, a base station key, on the basis of the intermediate key in the handover process, the base station key being necessary for generating a key for communication of the mobile station in the handover-target cell.

4. The mobile communication method according to claim 3, wherein
in the step (B), the handover-target radio base station sets the intermediate key as the base station key in the handover process.

5. A radio base station capable of serving as a handover-source radio base station in a mobile communication method in which a handover process is performed for allowing a mobile station to perform a handover from a handover-source cell under control of the handover-source radio base station to a handover-target cell under control of a handover-target radio base station, wherein
the radio base station is configured to generate an intermediate key, by inputting, into a first function, a base station key which is necessary for generating a key for communication of the mobile station in the handover-source cell, identification information of the handover-target cell, and identification information of a frequency for the handover-target cell; and to transmit, to the handover-target radio base station, the intermediate key, in the handover process.

6. A radio base station capable of serving as a handover-source radio base station in a mobile communication method in which a handover process is performed for allowing a mobile station to perform a handover from a handover-source cell under control of the handover-source radio base station to a handover-target cell under control of a handover-target radio base station, wherein
the radio base station is configured to generate an intermediate key, by inputting, into a first function, a parameter notified by an upper station, identification information of the handover-target cell, and identification information of a frequency for the handover-target cell; and to transmit, to the handover-target radio base station, the intermediate key, in the handover process.

7. A mobile station configured to perform a handover process for performing a handover from a handover-source cell under control of a handover-source radio base station to a handover-target cell under control of a handover-target radio base station, wherein
the mobile station is configured to generate an intermediate key, by inputting, into a first function, a base station key which is necessary for generating a key for communication of the mobile station in the handover-source cell, identification information of the handover-target cell, and identification information of a frequency for the handover-target cell, in the handover-target cell; and
the mobile station is configured to generate a base station key, on the basis of the intermediate key in the handover process, the base station key being necessary for generating a key for communication of the mobile station in the handover-target cell.

8. The mobile station according to claim 7, wherein
the mobile station is configured to set the intermediate key as the base station key in the handover process.

9. A mobile communication method of performing a handover process for allowing a mobile station to perform a handover from a handover-source cell under control of a handover-source radio base station to a handover-target cell under control of a handover-target radio base station, the method comprising the steps of:
(A) generating, at the handover-target radio base station, an intermediate key, by inputting, into a first function, a parameter notified by an upper station, identification information of the handover-target cell, and identification information of a frequency for the handover-target cell, in the handover process; and
(B) generating, at the handover-target radio base station, a base station key on the basis of the intermediate key in the handover process, the base station key being necessary for generating a key for communication of the mobile station in the handover-target cell.

10. The mobile communication method according to claim 9, wherein
in the step (B), the handover-target radio base station sets the intermediate key as the base station key in the handover process.

* * * * *